(12) United States Patent
Böwing et al.

(10) Patent No.: US 10,113,512 B2
(45) Date of Patent: Oct. 30, 2018

(54) GAS MIXER FOR INTERNAL COMBUSTION ENGINES

(75) Inventors: Robert Böwing, Innsbruck (AT); Steffen Gruber, Edingen-Neckarhausen (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 770 days.

(21) Appl. No.: 14/427,417

(22) PCT Filed: Sep. 12, 2012

(86) PCT No.: PCT/EP2012/003832
§ 371 (c)(1),
(2), (4) Date: May 28, 2015

(87) PCT Pub. No.: WO2014/040607
PCT Pub. Date: Mar. 20, 2014

(65) Prior Publication Data
US 2015/0308386 A1   Oct. 29, 2015

(51) Int. Cl.
*F02M 21/00* (2006.01)
*F02M 21/04* (2006.01)
(Continued)

(52) U.S. Cl.
CPC ........... *F02M 21/047* (2013.01); *B01F 3/026* (2013.01); *B01F 5/0413* (2013.01);
(Continued)

(58) Field of Classification Search
CPC ......... F02D 9/12; F02M 21/047; B01F 3/026; B01F 15/0248; B01F 2215/0086; Y02T 10/32
See application file for complete search history.

(56) References Cited

U.S. PATENT DOCUMENTS 4,492,207 A   1/1985   Hallberg
4,703,742 A   11/1987  Bennett
(Continued)

FOREIGN PATENT DOCUMENTS

DE   2226745   1/1973
DE   3524538   1/1987
(Continued)

OTHER PUBLICATIONS

International Search Report dated May 28, 2013, in Application No. PCT/EP2012/003832 by European Patent Office (2 pages).

*Primary Examiner* — Anshu Bhatia

(57) ABSTRACT

A gas mixer for mixing gaseous fuel and air for an internal combustion engine is disclosed. The gas mixer may have a housing defining an air path for mixing the gaseous fuel and the air within the air path. The housing may have a narrowed portion. The gas mixer may also have a displacement body axially displaceable and coaxially arranged within the air path. The displacement body and the housing may define an air passage disposed at the narrowed portion. The gas mixer may further have a fuel inlet fluidly connected to the air passage. The fuel inlet may be configured to supply gaseous fuel to the air passage. Further, the gas mixer may have an adjusting unit disposed at least partially within the air path. The adjusting unit may be connected to the displacement body and may be configured to axially displace the displacement body.

11 Claims, 4 Drawing Sheets

(51) Int. Cl.
*B01F 3/02* (2006.01)
*B01F 5/04* (2006.01)
*B01F 15/02* (2006.01)
*F02D 9/12* (2006.01)

(52) U.S. Cl.
CPC .. *B01F 15/0248* (2013.01); *B01F 2215/0086* (2013.01); *F02D 9/12* (2013.01); *Y02T 10/32* (2013.01)

(56) References Cited

U.S. PATENT DOCUMENTS

| | | | |
|---|---|---|---|
| 5,027,758 A * | 7/1991 | Siegler | F01M 3/02 |
| | | | 123/527 |
| 5,070,851 A * | 12/1991 | Janisch | F02M 13/08 |
| | | | 123/527 |
| 5,245,977 A | 9/1993 | Chen et al. | |
| 5,474,053 A * | 12/1995 | Suzuki | F02D 35/0061 |
| | | | 123/527 |
| 5,527,367 A | 6/1996 | Harada | |
| 5,595,163 A | 1/1997 | Nogi et al. | |
| 5,769,062 A | 6/1998 | Antão | |
| 6,810,863 B2 | 11/2004 | Memmott et al. | |
| 8,005,603 B2 | 8/2011 | Fisher et al. | |

FOREIGN PATENT DOCUMENTS

| | | |
|---|---|---|
| DE | 8800711 U1 | 4/1988 |
| DE | 4137573 A1 | 5/1993 |

* cited by examiner

GAS MIXER FOR INTERNAL COMBUSTION ENGINES

CLAIM FOR PRIORITY

This application is a U.S. National Phase entry under 35 U.S.C. § 371 from PCT International Application No. PCT/EP2012/003832, filed Sep. 12, 2012, which is incorporated herein by reference.

TECHNICAL FIELD

The present disclosure generally refers to gas mixers for internal combustion engines, particularly to gas mixers for gaseous fuel internal combustion engines for mixing gaseous fuel and air.

BACKGROUND

Gas mixers are commonly used to mix gaseous fuel with air for firing a gaseous fuel internal combustion engine. Particularly, gas mixers are used for mixing gaseous fuel and air having a desired fuel to air ratio, such that the gaseous fuel internal combustion engine is operated in a desired operating range.

For example, U.S. Pat. No. 5,245,977 A discloses a flow proportioning mixer for gaseous fuel and air. The mixer comprises a gas chamber adapted to discharge gaseous fuel into a mixing channel, and an air chamber adapted to direct air into the mixing channel to mix with the fuel. The mixer further comprises a plunger reciprocally mounted in the mixing channel and operated by any means from the outside of the mixer.

U.S. Pat. No. 8,005,603 B2 discloses a fuel control system for gas engines, wherein a gaseous carburetor includes a fuel metering assembly, a venturi mixer assembly, a throttle assembly, and an electronic control unit. The venturi mixer assembly comprises a venturi body, a hub concentrically located within the venturi body, and a series of hollow spray bars extending radially from the hub to the venturi body, wherein the venturi mixer assembly is made rigid.

An air fuel mixing device for producer gas is known from, for instance, U.S. Pat. No. 5,070,851 A. The mixing device is provided to generate a suitable air/fuel mixture for operating an internal combustion engine. The mixing device comprises stepped venturi inlets and means for adjusting the air flow without disturbing the standard throttle on the carburetor. A tapered needle valve is axially displaceable by a threaded shaft and a knob disposed outside of the mixing device.

The present disclosure is directed, at least in part, to improving or overcoming one or more aspects of prior systems.

SUMMARY OF THE DISCLOSURE

According to an aspect of the present disclosure, a gas mixer for an internal combustion engine for mixing gaseous fuel and air comprises a housing defining an air path including a narrowed portion. The exemplary disclosed gas mixer further comprises a displacement body axially displaceable and coaxially arranged within the air path. The displacement body and the housing define an air passage disposed at the narrowed portion. The gas mixer further comprises a fuel inlet fluidly connected to the air passage and configured to supply gaseous fuel to the air passage, and an adjusting unit disposed at least partially within the air path and connected to the displacement body, wherein the adjusting unit is configured to axially displace the displacement body.

According to another aspect of the present disclosure, a gaseous fuel internal combustion engine comprises an air inlet for supplying intake air, a fuel inlet for supplying gaseous fuel, and a gas mixer according to the present disclosure, wherein the gas mixer is fluidly connected to the air inlet and the fuel inlet. The gas mixer is configured to provide a mixture of gaseous fuel and air having a predetermined fuel to air ratio.

In some embodiments, the adjusting unit is axially disposed on the mixer body.

In some embodiments, the adjusting unit is disposed upstream of the displacement body. In yet some embodiments, the adjusting unit is disposed at least partially within the mixer body.

In some embodiments, the housing comprises a first pipe section and a second pipe section inserted into the first pipe section, wherein the first pipe section and second pipe section define a circumferential gap between each other. In such embodiment, the circumferential gap is fluidly connected to the air passage for providing gaseous fuel into the air path.

In some embodiments, the second pipe section is axially displaceable for adjusting the circumferential gap. In yet some embodiments, the axial displacements of the displacement body and the second pipe section are synchronized.

In some embodiments, the control rod is connected to a moving nut threaded received by the displacement body. The moving nut is configured to be rotated by the adjusting unit thereby axially displacing the displacement body.

In some embodiments, the gas mixer further comprises a spindle threaded received by a sleeve mounted to the displacement body and being connected to the second pipe section. In such embodiment, the spindle is configured to be rotated by the adjusting unit thereby axially displacing the second pipe section.

In some embodiments, the spindle comprises a first thread for displacing the second pipe section and having a first thread pitch, and the moving nut comprises a second thread for displacing the displacement body and having a second thread pitch. In such embodiment, the first thread pitch is smaller than the second thread pitch.

In some embodiments, the adjusting unit is a servomotor.

Other features and aspects of this disclosure will be apparent from the following description and the accompanying drawings.

DETAILED DESCRIPTION

Figure 1:
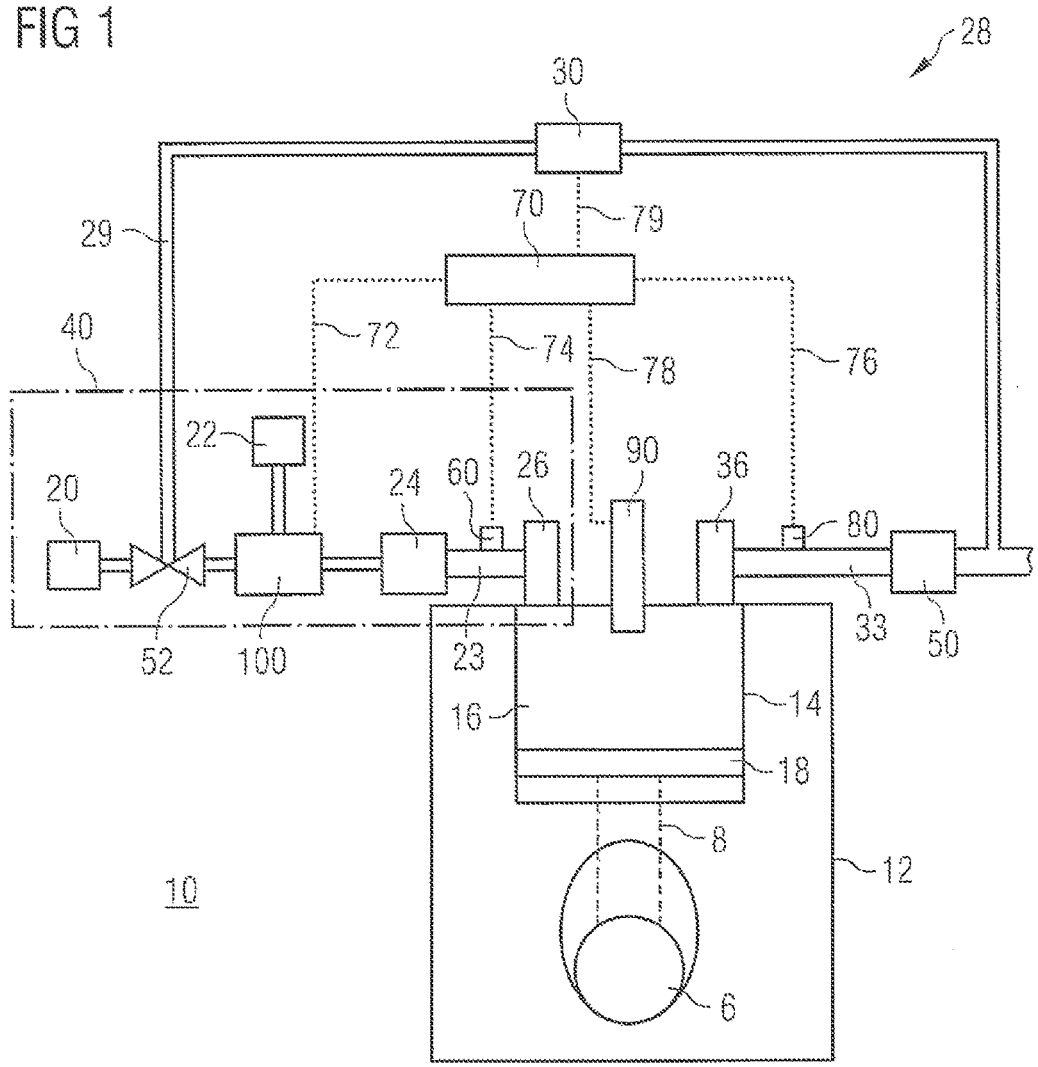
FIG. 1 shows an exemplary schematic diagram of a gaseous fuel internal combustion engine.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that a gas mixer including a venturi-shaped air path, an axially movable displacement body coaxially disposed within the venturi-shaped air path, and an adjusting unit being at least partially disposed within the air path may facilitate assembly of the gas mixer and may further support in precisely axially displacing the displacement body.

The present disclosure may be further based in part on the realization that the adjusting unit being at least partially disposed within the air path may not disturb the air flow, as the turbulences caused by the adjusting unit are negligible.

Referring now to the drawings, an exemplary embodiment of an internal combustion engine 10 is illustrated in FIG. 1. The internal combustion engine 10 may include features not shown, such as fuel systems, air systems, cooling systems, peripheries, drivetrain components, etc. For the purposes of the present disclosure, the internal combustion engine 10 is considered as a four-stroke gaseous fuel internal combustion engine. One skilled in the art will recognize, however, that the internal combustion engine 10 may be any type of engine (turbine, gas, diesel, natural gas, propane, dual fuel, etc.) that would utilize a gas mixer. Furthermore, the gaseous fuel internal combustion engine 10 may be of any size, with any number of cylinders, and in any configuration ("V," in-line, radial, etc.). The internal combustion engine 10 may be used to power any machine or other device, including locomotive applications, on-highway trucks or vehicles, off-highway trucks or machines, earth moving equipment, generators, aerospace applications, marine applications, pumps, stationary equipment, or other engine powered applications.

Referring to FIG. 1, the gaseous fuel internal combustion engine 10 is suited to essentially any application wherein an internal combustion power source is desired, and is particularly well suited to applications wherein it is desirable to limit emissions of certain pollutants, such as NOx compounds.

The gaseous fuel internal combustion engine 10 comprises an engine block 12, at least one cylinder 14 providing at least one combustion chamber 16 for combusting fuel, a piston 18, and a crank-shaft 6 connected to the piston 18 via a piston rod 8. The piston 18 is configured to reciprocate within the cylinder 14.

The gaseous fuel internal combustion engine 10 further comprises an air-fuel supply system 40 comprising a fuel source 22, an air inlet 20, a gas mixer 100, an intake manifold 24, an intake valve 26, and an intake pathway 23. The intake valve 26 is fluidly connected to the combustion chamber 16. The intake valve 26 is configured to enable injection of compressed charge air and/or a mixture of compressed charge air and gaseous fuel into the combustion chamber 16. After combusting the gas mixture, the exhaust gas is released out of the combustion chamber 16 via an exhaust valve 36 into, for example, an exhaust gas outlet pathway 33, which may fluidly connect to an associated exhaust gas system for treating the exhaust gas, such as a catalyst 50. The exhaust valve 36 is also fluidly connected to the combustion chamber 16.

The gas mixer 100 is provided and preferably disposed upstream the intake manifold 24 that supplies a combustion mixture to the engine block 12 and the associated cylinder 14. The gas mixer 100 communicates with an electronic control module 70 via a communication line 72, which in turn provides electronic signals to the gas mixer 100. The electronic control module 70 may be further configured to control the overall operation of the gaseous fuel internal combustion engine 10. Intake manifold pressure and temperature sensors 60 communicate the intake manifold pressure and temperature to the electronic control module 70 via a communication line 74.

As described herein, the gaseous fuel internal combustion engine 10 may also be a direct or port injection engine, or may include a pre-combustion chamber. A lambda sensor 80, well known in the art, is preferably positioned in the exhaust gas outlet pathway 33, and includes communication means, which may be direct or indirect, with the gas mixer 100. The lambda sensor 80 communicates with the electronic control module 70 via a communication line 76. The lambda sensor 80 is configured to provide a signal indicative of the content of oxygen within the exhaust gas. This signal may be used for calculating the desired air to fuel ratio of the mixture of gaseous fuel and air to be supplied to the cylinders. The catalyst 50, such as a three-way catalyst, may be positioned in the exhaust gas outlet pathway 33 to reduce pollutant emissions.

The gaseous fuel internal combustion engine 10 may further include an exhaust gas recirculation system or loop 28 that may be operable to circulate exhaust gas from the outlet pathway 33, preferably to the intake pathway 23. In the gaseous fuel internal combustion engine 10, exhaust gas may be shown as supplied from the outlet pathway 33. In such an embodiment, a venturi 52 or some other device may be preferably incorporated into the intake pathway 23 to facilitate delivery of the exhaust gas thereto, preferably upstream from its connection with the fuel source 22 via a supply line 29. In some embodiments, the venturi 52 may be disposed between of the gas mixer 100 and the intake manifold 24.

A pressure drop in the exhaust gas may typically result from, for instance, its passing through the catalyst 50, and some means for assisting in supplying the same to the intake pathway 23 may be generally desirable. It should be appreciated that exhaust gas may also be taken/pumped from a position upstream from, for example, the catalyst 50. In such an embodiment, the need for supplemental pumping of exhaust gas is reduced or eliminated, and a venturi 52 is unnecessary, as the pressure of exhaust gas upstream from, for example, the catalyst 50 will typically be sufficient to re-circulate the same.

Those skilled in the art will appreciate that the compression ratio of the gaseous fuel internal combustion engine 10 is insufficient to cause compression ignition of gaseous fuel in the combustion chamber 16. Instead, each cylinder 14 of the gaseous fuel internal combustion engine 10 is equipped with a spark plug 90 that receives control signals from the electronic control module 70 via a communication line 78.

The exhaust gas recirculation system 28 may further include an exhaust gas intercooler (not shown), for example, a conventional heat exchanger, and an adjustable exhaust gas control valve 30. The exhaust gas control valve 30 may receive control signals from the electronic control module 70 via a communication line 79.

Figure 2:
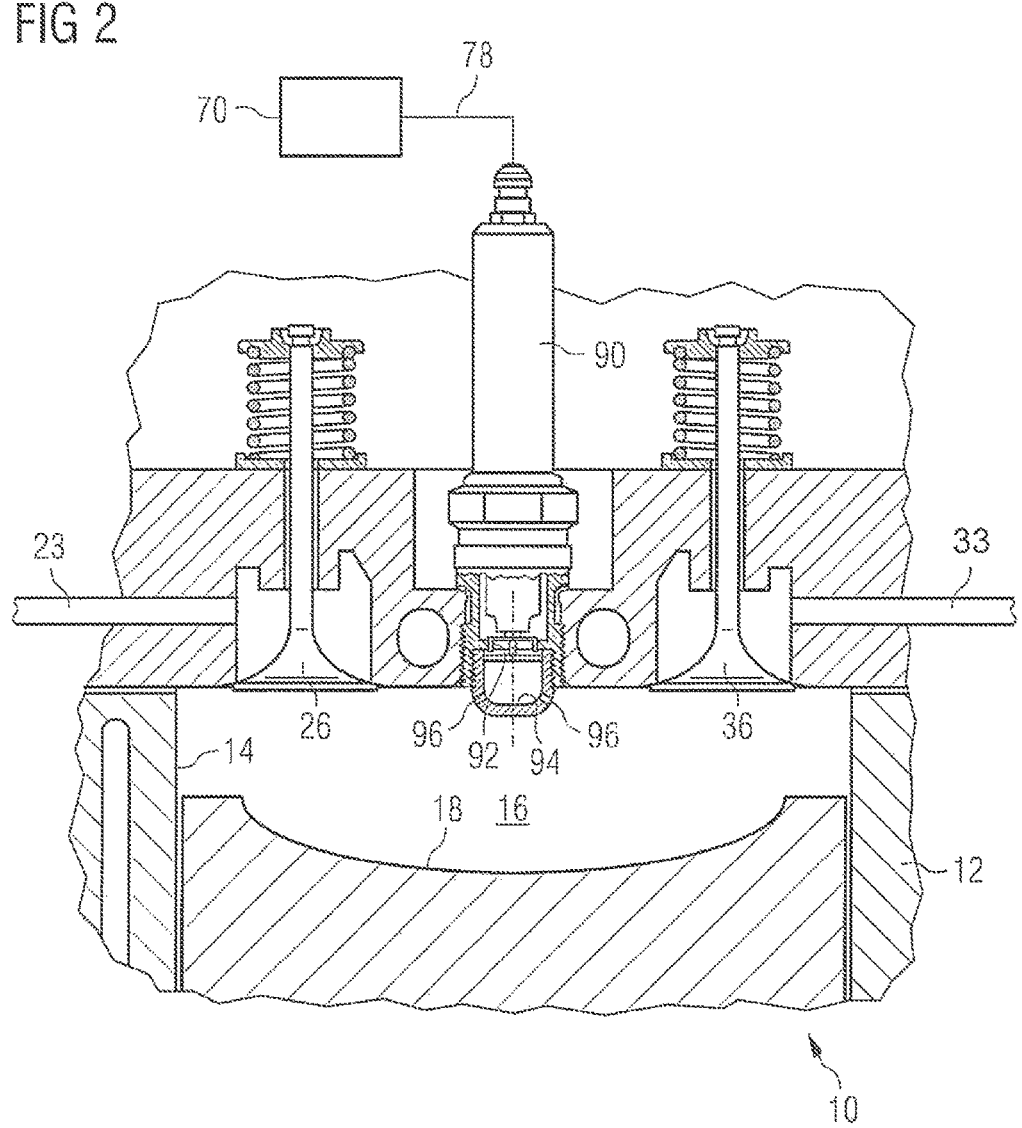
FIG. 2 is a sectioned view of an engine cylinder of the gaseous fuel internal combustion engine shown in FIG. 1.

Referring to FIG. 2, the engine block 12 including the plurality of engine cylinders 14 is shown in greater detail. The spark plug 90 provides a spark being formed at a spark gap 92 located in a pre-combustion chamber 94. The spark ignited gas mixture in the pre-combustion chamber 94 then ignites the remaining mixture of gaseous fuel, air and, optionally, exhaust gas in the combustion chamber 16 via flames projected through flame communication passages 96.

Nevertheless, those skilled in the art will appreciate that the present disclosure also contemplates spark ignited gaseous fuel engines that do not include a pre-combustion chamber 94, but instead may utilize a different spark plug configuration, such as a conventional J-gap type spark plug known in the art. Each cylinder 14 is also equipped with the intake valve 26 that receives a mixture of exhaust gas, gaseous fuel and air from the intake manifold 24. Likewise, each cylinder 14 includes the exhaust valve 36 for evacuating combustion products from the combustion chamber 16 to the exhaust gas outlet pathway 33.

Those skilled in the art will further recognize that the gaseous fuel internal combustion engine 10 may not be provided with an exhaust gas recirculation system 28. In such embodiment, the intake valve 26 may receive a mixture of gaseous fuel and air from the intake manifold 24 without exhaust gas.

The electronic control module 70, preferably including a programmable microprocessor, is also preferably provided, and is operable to control various of the components of the gaseous fuel internal combustion engine 10, as described herein. The electronic control module 70 is preferably in communication with the lambda sensor 80 via a communication line 76. The lambda sensor 80 may, for example, be configured to generate periodic signals to the electronic control module 70, or the electronic control module 70 may itself activate the lambda sensor 80 to determine a reading of the exhaust gas.

In either case, the electronic control module 70 is preferably operable to determine a lambda value, or reciprocal of the fuel to air ratio for the engine. The electronic control module 70 is further preferably operable to adjust a fuel to air ratio of the combustion mixture via a communication line 72 with the gas mixer 100.

The person skilled in the art will appreciate that the electronic control module 70 controls the engine components, such as, for example, intake valve 26, exhaust valve 36, gas mixer 100, and spark plug 75, to operate the gaseous fuel internal combustion engine 10. In some embodiments, the electronic control module 70 may control the gaseous fuel internal combustion engine 10 by adjusting a desired density of the gas mixture supplied to the cylinders 14.

In general, a higher density results in lower NOx production. However, if the density is too high, for example, where too much exhaust gas is added to the combustion mixture, lean misfire can occur. Likewise, a density being too low may result in engine knock. Thus, the gas flow quantity is generally adjusted between the engine misfire margin and the engine knock margin to obtain a desired NOx content.

As described herein, the electronic control module 70, in cooperation with the lambda sensor 80 and the gas mixer 100, preferably maintains the fuel to air ratio as close as is practicable to stoichiometric quantities. This can take place by adjusting a gaseous fuel quantity supplied to the intake pathway 23, or a fuel quantity injected into the engine cylinders or pre-combustion chambers. In some embodiments, exhaust gas may be pumped into the intake pathway 23 to increase the density of the gas mixture entering the manifold 24. The relative proportions of fuel and air supplied to the gaseous fuel internal combustion engine 10 are preferably generally maintained, however, and the re-circulated exhaust gas may act as an inert gaseous heat sink, lowering the combustion temperature.

In some embodiments, the electronic control module 70 may include a computer readable medium having a control algorithm recorded thereon for controlling the indicative value determination, and gas flow quantity. The algorithm may include means for determining a value indicative of a density of the gas mixture, preferably on the basis of the measured manifold temperature and pressure, and may also include means for setting a gas flow quantity based at least in part on the value. The control algorithm may make use of, for instance, the ideal gas equation in determining this value, although alternative means are contemplated, as described herein.

The electronic control module 70 may be further programmed with a second or the same control algorithm having means for determining the fuel to air ratio in the gaseous fuel internal combustion engine 10, and for setting the same or adjusting the same toward a desired, for example, stoichiometric fuel to air ratio. Because the gaseous fuel internal combustion engine 10 may operate as close as is practicable to stoichiometric fuel and air proportions, gas mixture density adjustment is preferably based at least in part on operation with a lambda value relatively close to one.

The electronic control module 70 may also be configured with a conventional gaseous fuel supply system control algorithm recorded on the medium and executable by a process or associated with the electronic control module 70 to control the operation of the gas mixer 100, and hence the supply of fuel and air to the gaseous fuel internal combustion engine 10. In addition, the electronic control module 70 may include a spark plug control algorithm recorded on the medium for controlling the timing and duration of spark events. Ignition events may typically occur when the piston 18 is in a vicinity of a top dead center of a compression stroke by the spark plug 90 to control ignition timing of the gas mixture in engine cylinder 14.

Figure 3:
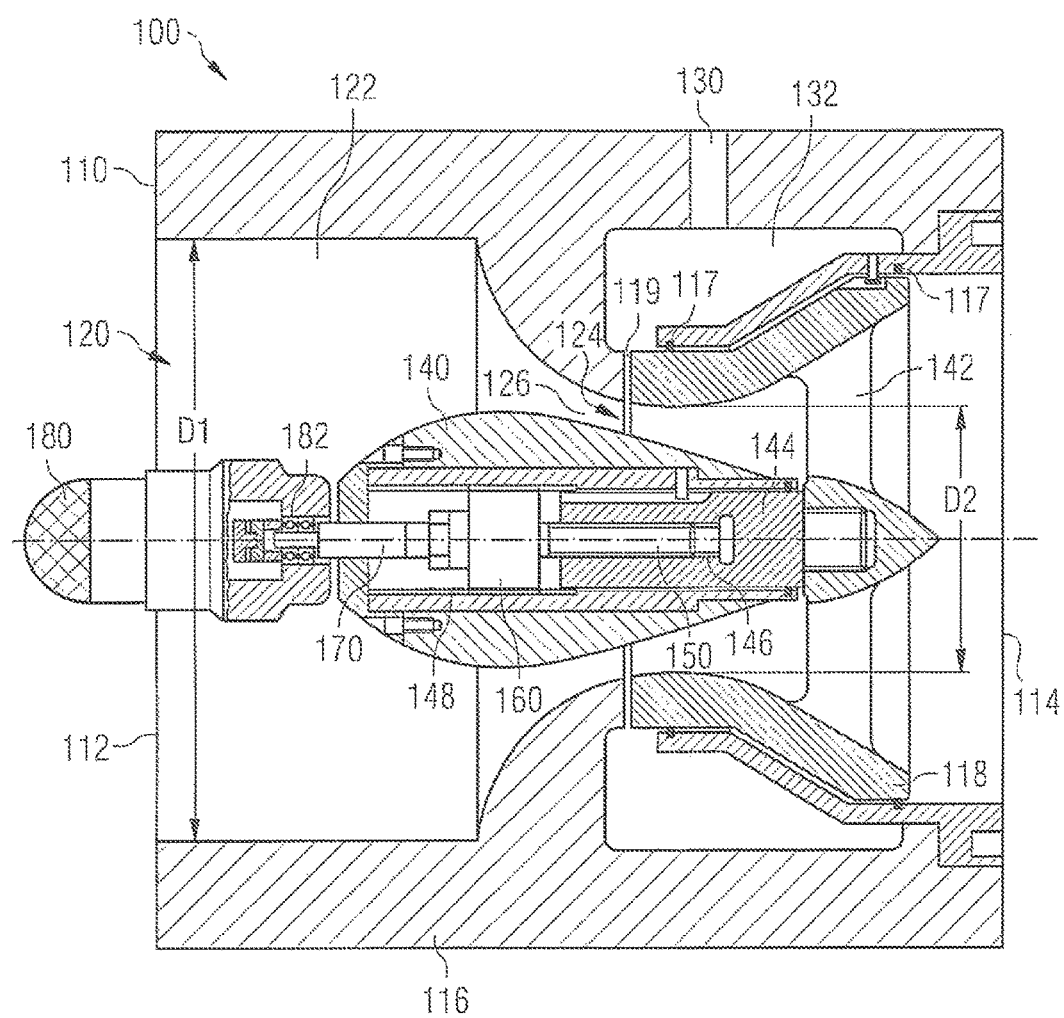
FIG. 3 is a sectioned view of an exemplary disclosed venturi mixer of the gaseous fuel internal combustion engine shown in FIG. 1.
Figure 4:
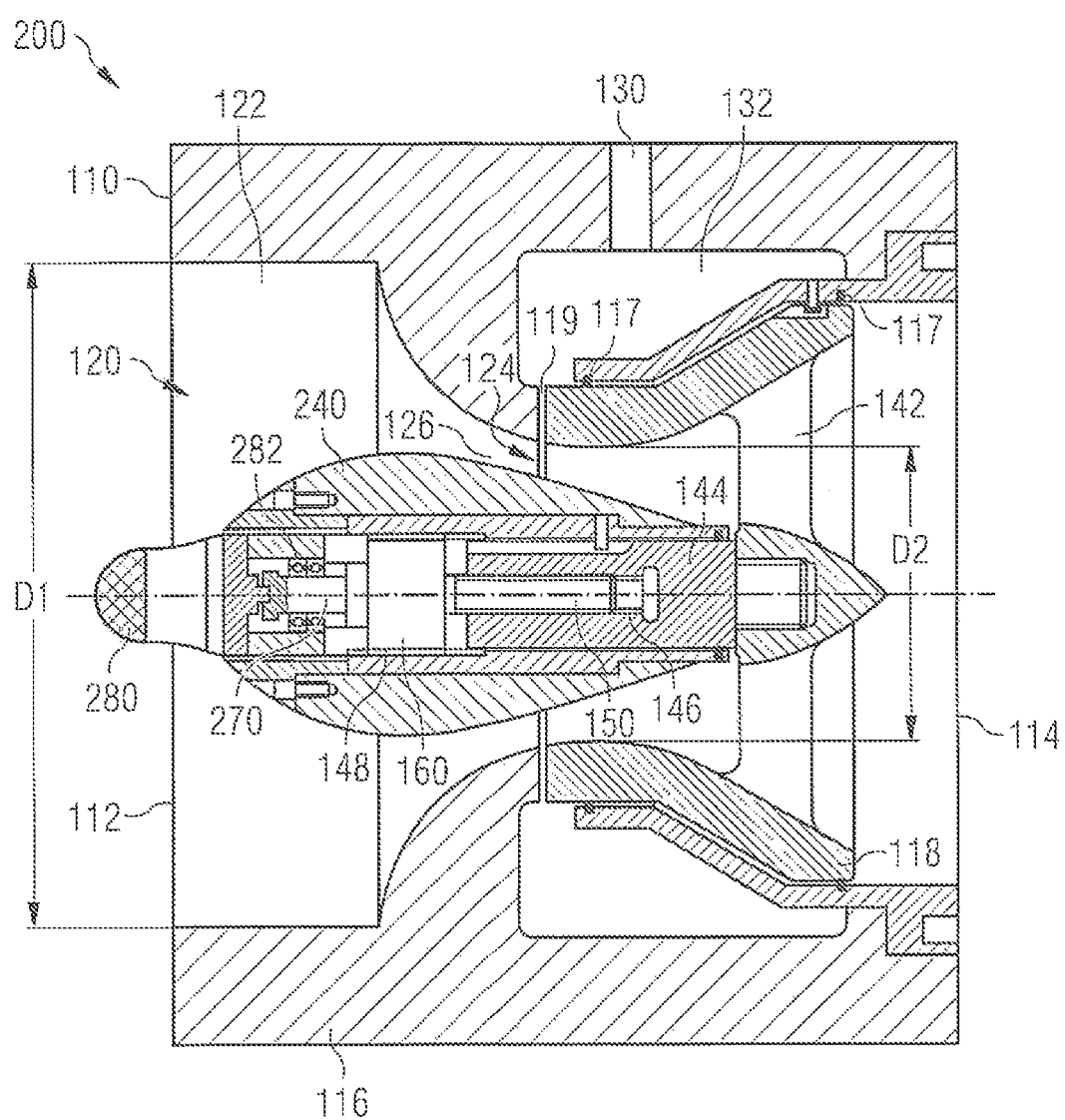
FIG. 4 is a sectioned view of another exemplary disclosed venturi mixer of the gaseous fuel internal combustion engine shown in FIG. 1.

With respect to FIGS. 3 and 4, exemplary embodiments of the gas mixer 100 are shown in greater detail. Generally, the gas mixer 100 comprises a housing 110 defining an air path 120. The housing 110 comprises an inlet 112 configured to be connected to the air inlet 20 for receiving compressed air. The housing 110 further comprises an outlet 114 for connecting to, for example, the intake pathway 23 and for supplying a mixture of gaseous fuel and air having a predetermined fuel to air ratio.

The air path 120 may have venturi-like shape. For example, the air path 120 may comprise a cylindrical portion 122 having a first diameter D1, and a narrowed portion 124 having a second diameter D2 being smaller than the first diameter D1. The narrowed portion 124 may, for example, have a tapered cross section. In some embodiments, the first diameter D1 may be in a range from, for example, about 20 cm to 35 cm, and the second diameter D2 may be in a range from, for example, about 10 cm to 25 cm.

The housing 110 further comprises a fuel inlet 130 for receiving, for example, gaseous fuel from the fuel source 22. The gaseous fuel originating from the fuel source 22 may be pre-stored in a fuel chamber 132.

The housing 110 further includes a first pipe section 116 and a second pipe section 118 inserted into the first pipe section 116 and being axially displaceable therein. The first pipe section 116 and the second pipe section 118 may define a circumferential gap 119 fluidly interconnecting the air path 120 and the fuel chamber 132. Preferably, the circumferential gap 119 may be disposed at the narrowed portion 124 formed by the first and second pipe sections 116, 118. The circumferential gap 119 is configured to supply gaseous fuel from the fuel chamber 132 into the air path 120, thereby utilizing the so-called venturi-effect. For sealing between the first and second pipe sections 116, 118, the second pipe section 118 abuts the first pipe section 116 via two seals 117.

A person skilled in the art will appreciate that air passing the gas mixer 100 from the left to the right of FIGS. 3 and 4 may, due to the venturi effect, suck in gaseous fuel from the fuel chamber 132 through the circumferential gap 119 and may mix with the gaseous fuel within the air passage 126. Due to the smaller diameter D2 of the narrowed portion 124, the flow velocity of the air may increase at the narrowed portion 124, which may lead to sucking in of gaseous fuel. Thus, the air path 120 comprises a shape of a so-called venturi-nozzle.

A displacement body 140 is coaxially arranged within the housing 110, particularly within the first and second pipe sections 116, 118. The displacement body 140 may be provided with a central portion having the largest cross-section and being tapered in both directions streamwise and counter-streamwise. In some embodiments, the displacement body 140 may be a cone-like shaped body having only one tapered portion.

The displacement body 140 is preferably assigned to the circumferential gap 119 at the narrowed portion 124 and is axially displaceable. The displacement body 140 and the housing 110, particularly the first and second pipe sections 116, 118, define a air passage 126 through the gas mixer 100. Preferably, the air passage 126 is disposed at the narrowed portion 124 and comprises an annular shape. The volume of the air passage 126 is adjustable by axially displacing the displacement body 140 within the air path 120 thereby also adjusting the flow quantity of air flowing through the gas mixer 100. This may also result in adjusting the flow velocity of the air and, thus, may result in adjusting the quantity of gaseous fuel sucked into the air path 120 form the fuel chamber 132.

As shown in FIG. 3, for also adjusting the gaseous fuel amount sucked in from the fuel chamber 132 into the air path 120, the second pipe section 118 may be axially displaced thereby adjusting the volume of the circumferential gap 119. For axially displacing the second pipe section 118, starlike bars 142 are mounted to the second pipe section 118. The starlike bars 142 are further connected to a sleeve 144 mounted to a first end of the displacement body 140. The center of the sleeve 144 comprises a first thread 146 engageably accommodating a spindle 150. By pivoting the spindle 150, the circumferential gap 119 is adjusted, as the sleeve 144, the starlike bars 142, and the second pipe section 118 are axially displaced.

The displacement body 140 includes a second thread 148 engageably accommodating a moving nut 160 being threadably adjustable coupled to the spindle 150. The displacement body 140 completely encloses the moving nut 160 and partially encloses the sleeve 144. By pivoting the moving nut 160, the displacement body 140 may be axially displaced.

The moving nut 160 may be connected to a control rod 170 extending out of the displacement body 140 and being pivotally connected to an adjusting unit 180 mounted on the displacement body 140. Thus, the control rod 170 may be interconnected between the adjusting unit 180 and the displacement body 140. In the embodiment shown in FIG. 3, the adjusting unit 180 is mounted on the displacement body 140 from an upstream side thereof. However, the skilled person will recognize that the adjusting unit 180 may also be mounted on the displacement body 140 from a downstream side thereof As illustrated in FIG. 3, the adjusting unit 180 is at least partially disposed within the housing 110 and, thus, within the air path 120. In some embodiments, the adjusting unit 180 may be completely disposed within the housing 110.

The person skilled in the art will recognize that the adjusting unit 180 is at least partially supported by the housing 110, such that the adjusting unit 180 is able to axially displace the displacement body 140. The support of the adjusting unit 180 by the housing 110 is not explicitly shown by the drawings.

The adjusting unit 180 is connected to the displacement body 140 via the control rod 170. The adjusting unit 180 is configured to, for instance, rotate the control rod 170 thereby operating the moving nut 160 and the spindle 150 coupled to the moving nut 160. In some embodiments, the adjusting unit 180 may be a servomotor known in the art. In yet some embodiments, the adjusting unit 180 may be configured to push and/or pull the control rod 170 for axially displacing the displacement body 140 and/or the second pipe section 118.

The first thread 146 comprises a first thread pitch and the second thread 148 comprises a second thread being greater than the first thread pitch. Thus, by rotating the control rod 170, also the spindle 150 is operated and, thus, the circumferential gap 119 as well as the displacement body 140 may be adjusted as desired. In the embodiment shown in FIG. 3, the adjustment of the displacement body 140 and the second pipe section 118 is synchronized. However, the person skilled in the art will recognize that the adjustment of the displacement body 140 may also be independent from the adjustment of the second pipe section 118.

The control rod 170 being, for instance, a cylindrical rod is received and supported by bearings 182, for example, ball bearings disposed within the adjusting unit 180. In some embodiments, the bearings 182 may be tapered roller bearings.

Referring to FIG. 4, another embodiment of a gas mixer 200 according to the present disclosure is shown in greater detail. It is noted that same components of FIG. 3 are provided with same reference signs in FIG. 4.

In the embodiment shown in FIG. 4, a displacement body 240 at least partially accommodates an adjusting unit 280. This means that the adjusting unit 280 is at least partially disposed within the displacement body 240. The adjusting unit 280 includes a control rod 270 being supported by at least one bearing 282.

By disposing the adjusting unit 280 at least partially within the displacement body 240, the aerodynamic of the displacement body 140 and the adjusting unit 280 may be enhanced and the generation of, for instance, any flow turbulences may be reduced.

It should be noted that the embodiments shown in FIGS. 3 and 4 are both provided with an axially displaceable displacement body and second pipe section. The person skilled in the art will appreciate that, in some embodiments, the gas mixer may only be provided with either an axially displaceable displacement body or with an axially displaceable second pipe section.

INDUSTRIAL APPLICABILITY

In the following, operation of the gaseous fuel internal combustion engine 10 is described in connection with FIGS. 1 to 3.

It is generally desirable to operate the gaseous fuel internal combustion engine 10 with as close as practicable to stoichiometric quantities of fuel and air in the combustion mixture. At a stoichiometric fuel to air ratio, lambda is equal to one. Accordingly, the electronic control module 70 will continually or regularly calculate a lambda value and adjust the fuel to air ratio toward the desired proportions as needed by controlling the gas mixer 100.

For example, where the calculated lambda value indicates that the mixture is running too rich, the gas mixer 100 can be adjusted to reduce the fuel quantity supplied to the intake pathway 23. Where the lambda value indicates that the mixture is running too lean, the electronic control module 70 can adjust the gas mixer 100 to increase the quantity of fuel supplied to the intake pathway 23.

The electronic control module 70 is configured to continuously calculate the desired fuel to air ratio based on, for example, the desired power output of the gaseous fuel internal combustion engine 10, the accelerator pedal position, manifold pressures, gas pressures, or any other parameters appropriate for calculating the desired fuel to air ratio.

In general, a load on the gaseous fuel internal combustion engine 10 can be roughly correlated with the fuel to air ratio. Thus, calculation of the lambda value and adjustment of the fuel to air ratio can be primarily a fine adjustment. In other words, the process can take place at least in part by referencing a pre-recorded map of fuel to air ratios based on various engine load levels with the electronic control module 70, which can in turn command relatively fine adjustments in the fuel and/or air supply.

Those skilled in the art will appreciate that other suitable means exist for running the gaseous fuel internal combustion engine 10 at or close to a stoichiometric fuel to air ratio, and these other means may be employed without departing from the intended scope of the present disclosure.

By transmitting an appropriate adjustment signal via the communication line 72, the adjusting unit 180 causes, for example, the displacement body 140 to axially displace, thereby adjusting the volume of the air passage 126 between the displacement body 140 and the housing 110, particularly between the displacement body 140 and the first and second pipe sections 116, 118. The adjustment of the volume of the air passage 126 may in turn adjust the quantity of air passing through the narrowed portion 124 and, thus, the quantity of gaseous fuel sucked into the air path 120 from the fuel chamber 132 thereby achieving a desired fuel to air ratio.

The adjusting unit 180 may further adjust the volume of the circumferential gap 119 which also affects the quantity of gaseous fuel sucked into the air path 120. This may also support in achieving the desired fuel to air ratio.

In particular, the adjusting unit 180 causes the control rod 170 to rotate, which in turn may rotate the moving nut 160 and the spindle 150. Due to the different thread pitches of the first and second threads 146, 148, the axial displacement of the displacement body 140 and the second pipe section 118 is synchronized. In some embodiments, rotation of the spindle 150 may only cause the sleeve 144 to axially displace thereby axially displacing only the second pipe section 118 and the starlike bars 142.

In yet some embodiments, rotation of the control rod 170 may only cause the displacement body 140 to be axially disposed. In such embodiment, displacement of the displacement body 140 and the second pipe section 118 may be independent from each other, i.e. displacements of the displacement body 140 and the second pipe section 118 may be synchronized.

Although the preferred embodiments of this invention have been described herein, improvements and modifications may be incorporated without departing from the scope of the following claims.

The invention claimed is:

1. A gas mixer for mixing gaseous fuel and air for an internal combustion engine, the gas mixer comprising:
   a housing defining an air path for mixing the gaseous fuel and the air within the air path, the housing comprising a narrowed portion;
   a displacement body axially displaceable and coaxially arranged within the air path, the displacement body and the housing defining an air passage disposed at the narrowed portion;
   a fuel inlet fluidly connected to the air passage and configured to supply gaseous fuel to the air passage; and
   an adjusting unit disposed at least partially within the air path and connected to the displacement body, the adjusting unit being configured to axially displace the displacement body,
   wherein the housing comprises a first pipe section and a second pipe section inserted into the first pipe section, the first pipe section and the second pipe section defining a circumferential gap between each other, the circumferential gap being fluidly connected to the air passage for providing gaseous fuel into the air path and
   wherein the second pipe section is axially displaceable by the adjusting unit.

2. The gas mixer of claim 1, wherein the adjusting unit is axially mounted on the displacement body.

3. The gas mixer of claim 1, wherein the adjusting unit is disposed upstream of the displacement body.

4. The gas mixer of claim 1, wherein the adjusting unit is disposed at least partially within the displacement body.

5. The gas mixer of claim 1, wherein the second pipe section is axially displaceable for adjusting the circumferential gap.

6. The gas mixer of claim 5, wherein the axial displacement of the displacement body and the axial displacement of the second pipe section are synchronized.

7. The gas mixer of claim 1, wherein the displacement body comprises at least one tapered portion being assigned to the circumferential gap.

8. A gas mixer for mixing gaseous fuel and air for an internal combustion engine, the gas mixer comprising:
   a housing defining an air path for mixing the gaseous fuel and the air within the air path, the housing comprising a narrowed portion;
   a displacement body axially displaceable and coaxially arranged within the air path, the displacement body and the housing defining an air passage disposed at the narrowed portion;
   a fuel inlet fluidly connected to the air passage and configured to supply gaseous fuel to the air passage;
   an adjusting unit disposed at least partially within the air path and connected to the displacement body, the adjusting unit being configured to axially displace the displacement body; and
   a control rod interconnected between the adjusting unit and the displacement body,
   wherein the housing comprises a first pipe section and a second pipe section inserted into the first pipe section, the first pipe section and the second pipe section defining a circumferential gap between each other, the circumferential gap being fluidly connected to the air passage for providing gaseous fuel into the air path and wherein the control rod is connected to a moving nut threadably received by the displacement body and configured to be rotated by the adjusting unit thereby axially displacing the displacement body.

9. The gas mixer of claim 8, further comprising a spindle threadably received by a sleeve mounted to the displacement body and connected to the second pipe section, the spindle being configured to be rotated by the adjusting unit thereby axially displacing the second pipe section.

10. The gas mixer of claim 9, wherein the spindle comprises a first thread for displacing the second pipe section, the first thread having a first thread pitch, and the moving nut comprises a second thread for displacing the displacement body, the second thread having a second thread pitch, the first thread pitch being smaller than the second thread pitch.

11. The gas mixer of claim 1, wherein the adjusting unit is a servomotor.

* * * * *